O. E. BROWN.
NON-SKID VEHICLE TIRE.
APPLICATION FILED MAR. 9, 1917.

1,258,863.

Patented Mar. 12, 1918.

Inventor,
Oscar E. Brown
by Geyer & Poppe
Attorneys.

UNITED STATES PATENT OFFICE.

OSCAR E. BROWN, OF BUFFALO, NEW YORK.

NON-SKID VEHICLE-TIRE.

1,258,863.	Specification of Letters Patent.	Patented Mar. 12, 1918.

Application filed March 9, 1917. Serial No. 153,602.

*To all whom it may concern:*

Be it known that I, OSCAR E. BROWN, a citizen of the United States, residing at Buffalo, in the county of Erie and State of New York, have invented new and useful Improvements in Non-Skid Vehicle-Tires, of which the following is a specification.

This invention relates to the class of vehicle-tires which are provided on their treads with bosses or projections to prevent skidding of the vehicle.

One of its objects is to increase the durability of the tread-projections without detracting from the resilience of the tire.

Further objects of the invention are to produce a smooth-running, ever-ready tire-tread and to provide the same with improved non-skid devices which are not liable to injure roads, parkways or pavements, nor cause vertical vibration of the vehicle.

Figure 1:
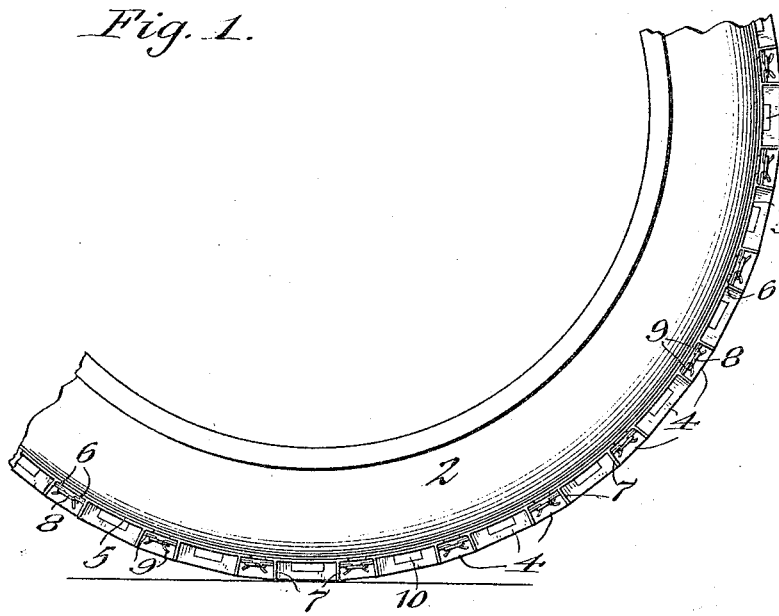
Figure 2:
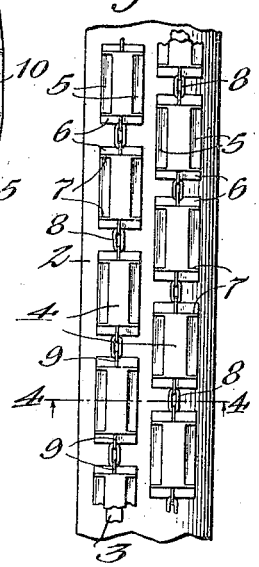
Figure 3:
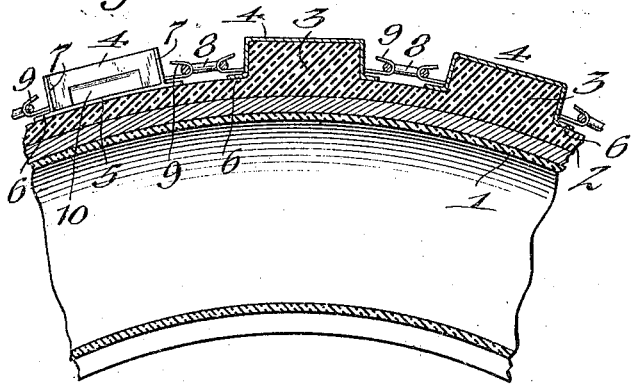
Figure 4:
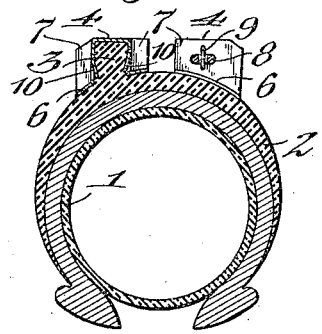
Figure 5:
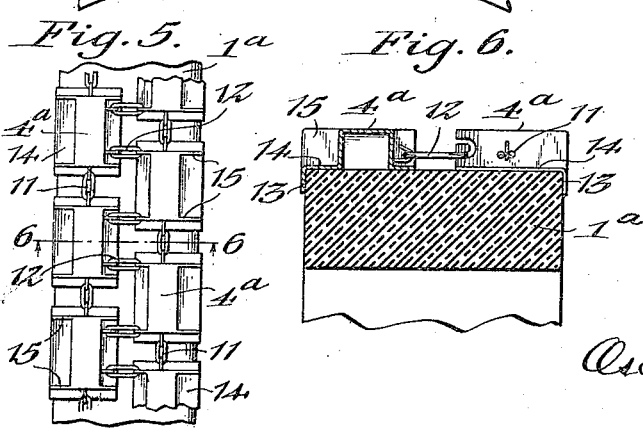
Figure 6:
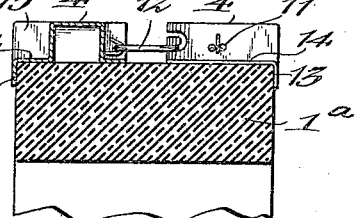

In the accompanying drawings: Figure 1 is a fragmentary side elevation of a pneumatic tire embodying the invention. Fig. 2 is a fragmentary face view thereof. Fig. 3 is a fragmentary longitudinal section of the tire, on an enlarged scale. Fig. 4 is a transverse section, on line 4—4, Fig. 2, on an enlarged scale. Fig. 5 is a fragmentary face view of a solid tire provided with the improvement. Fig. 6 is an enlarged transverse section on line 6—6, Fig. 5.

Similar characters of reference indicate corresponding parts throughout the several views.

Referring to the embodiment of the invention illustrated in Figs. 1—4, 1 indicates the air tube and 2 the shoe of a pneumatic tire of any ordinary construction. The shoe is provided along its tread with one or more circumferential rows of knobs, bosses or projections 3 spaced at suitable intervals, the projections in adjacent rows being preferably staggered, as best shown in Fig. 2. Each of these projections is armored or reinforced by a metallic cap or hollow boss 4 closely fitted over it and inclosing it on all sides. These caps receive the wear of the tire and are removably mounted on the projections 3, so that they can be readily renewed when worn out. In the preferred construction shown in the drawings, the caps are provided at their sides and ends with projecting base flanges 5 and 6 which rest upon and conform to the tread-portion of the shoe 2. At both ends each cap is provided with transverse non-skid wings or flanges 7 adapted to prevent lateral as well as circumferential slipping of the tire on the road or pavement. These wings are arranged substantially at right angles to the base-flanges of the caps and their outer or tread-edges are preferably flush with the smooth tread-faces of the caps, as shown, whereby the wings permit the tire to run smoothly and without causing vertical vibration of the vehicle.

The several caps of the same row are united by suitable flexible connections constructed to permit them to move freely in and out with the tread of the tire so as not to detract from its resilience. In the preferred construction shown in the drawings, these connections consist of links 8 which engage hooks 9 attached to the opposing ends of the caps. The caps and flexible connections form an endless band of metallic projections or bosses which embraces the tire-shoe and which is held from displacement thereon by the rubber projections 3.

Additional means may be employed for retaining the metallic caps upon the projections 3, if desired. For example, as shown in Figs. 3 and 4, the caps may be provided in their sides with integral tongues 10 adapted to be pressed against the sides of the projections after the caps have been applied thereto.

By this construction when any of the caps are worn out, they can be readily removed and replaced by new ones by simply disconnecting the links 8 from the hooks 9 of the caps requiring renewal. As the caps receive all the wear, the inclosed rubber projections 3 remain intact for a considerable time, greatly increasing the durability of the tire. In this embodiment of the invention, the projections act as cores or fillers for the metallic caps or hollow bosses.

If desired, these caps may be used without such tire-projections. A modification of this kind is shown in connection with a solid tire 1ª in Figs. 5 and 6. In this case, the caps or hollow bosses 4ª are arranged in one or more circumferential rows. Those of each row are united at their ends by flexible connections 11 and inasmuch as the tire is flat, the caps of adjacent rows are also linked together at their inner sides, as shown at 12, to hold them against outward displacement on the tire. Means are also provided for holding them against inward displacement thereon the device as shown in the drawings consisting of longitudinal flanges 13 extending inwardly from the side base-flanges 14 of the caps and overlapping the edges of the tire. In this modification, the caps are also provided with transverse or laterally-extending non-skid wings 15.

The provision of these non-skid wings renders the tire particularly desirable on rutty roads, the wings cutting into the walls of the ruts and helping to lift the vehicle wheels out of the same. At the same time these wings are not liable to injure the road or pavement, because their outer edges do not extend beyond the faces or tread-portions of the metallic caps.

In either of the embodiments of the invention, the same furnishes an ever-ready, non-skid tread which can be quickly and conveniently applied.

My improvement is equally desirable for the curved-tread tires of passenger cars and the flat tread tires of commercial trucks.

While I have herein shown the tire provided with two rows of such caps or projections and caps, a greater number may obviously be used, according to the width of the tire, while in some cases a single row may be sufficient.

If desired, the caps of the constructions illustrated in Figs. 1-4, may be linked together at their sides, as well as their ends, as shown in Figs. 5 and 6, but such side connections are ordinarily not necessary with tires having knobs or projections.

The caps and the tire-projections may be of any suitable or desired shape, but the oblong form shown in the drawings is preferable.

I claim as my invention:

1. A vehicle tire provided on its tread with a circumferential row of caps having smooth tread-faces, said caps being provided with non-skid wings extending laterally therefrom and having their tread-edges arranged substantially flush with the tread-faces of the caps, and means for flexibly connecting the caps.

2. A tire tread comprising a series of hollow metallic caps having smooth tread-faces and non-skid wings extending laterally from the caps and having their tread-edges arranged substantially flush with the tread-faces of the caps, and means for flexibly connecting said caps.

3. A vehicle tire provided on its tread with a circumferential row of metallic caps forming projections, each of said caps being provided at its ends with laterally-projecting non-skid wings extending from the base to the tread of the cap, and means for flexibly connecting the caps.

4. A vehicle tire provided on its tread with a circumferential row of metallic caps forming projections, each cap being provided at its sides and ends with base flanges resting upon the tire and at its ends with laterally-extending non-skid wings arranged substantially at right angles to said base flanges, and means for flexibly connecting adjacent caps.

OSCAR E. BROWN.

Copies of this patent may be obtained for five cents each, by addressing the "Commissioner of Patents, Washington, D. C."